United States Patent [19]

Baca

[11] 4,170,302
[45] Oct. 9, 1979

[54] THERMAL PIZZA PLATE

[76] Inventor: Carlos M. Baca, P.O. Box 396, Bernalillo, N. Mex. 87004

[21] Appl. No.: 895,636

[22] Filed: Apr. 12, 1978

[51] Int. Cl.² .............................................. B65D 11/10
[52] U.S. Cl. ................................. 206/545; 220/94 R; 206/549
[58] Field of Search ...................... 206/542, 545, 549; 220/85 R, 94 R, 412, 431–432, DIG. 10; 294/27 R, 27 H

[56] References Cited

U.S. PATENT DOCUMENTS

| 120,769 | 11/1871 | Nobles | 206/549 |
| 1,511,641 | 10/1924 | Sullivan | 220/412 |
| 2,555,126 | 5/1951 | Greve | 206/545 |
| 2,555,788 | 6/1951 | Donaldson | 206/545 |
| 2,724,494 | 11/1955 | Graff | 206/545 |
| 3,484,015 | 12/1969 | Rowan | 206/545 X |
| 4,058,214 | 11/1977 | Mancuso | 206/545 |

Primary Examiner—William Price
Assistant Examiner—Joseph M. Moy

[57] ABSTRACT

A carrier for a cooked pizza pie, and which keeps it hot while being carried home; the carrier including a vessel-type outside container, in a center of which there is mounted a rest made of a lower metal disc and upper plastic disc, a large insulation disc upon the rest, and a smaller size plastic filter upon the insulation for placement of the heated pizza pie thereupon, a removable lid, having cork on the underside, being screwed around the plastic filter so as to enclose the pizza pie, and the handle having a handle across its top, which in a modified design includes a pizza cutter wheel and a spatula.

2 Claims, 3 Drawing Figures

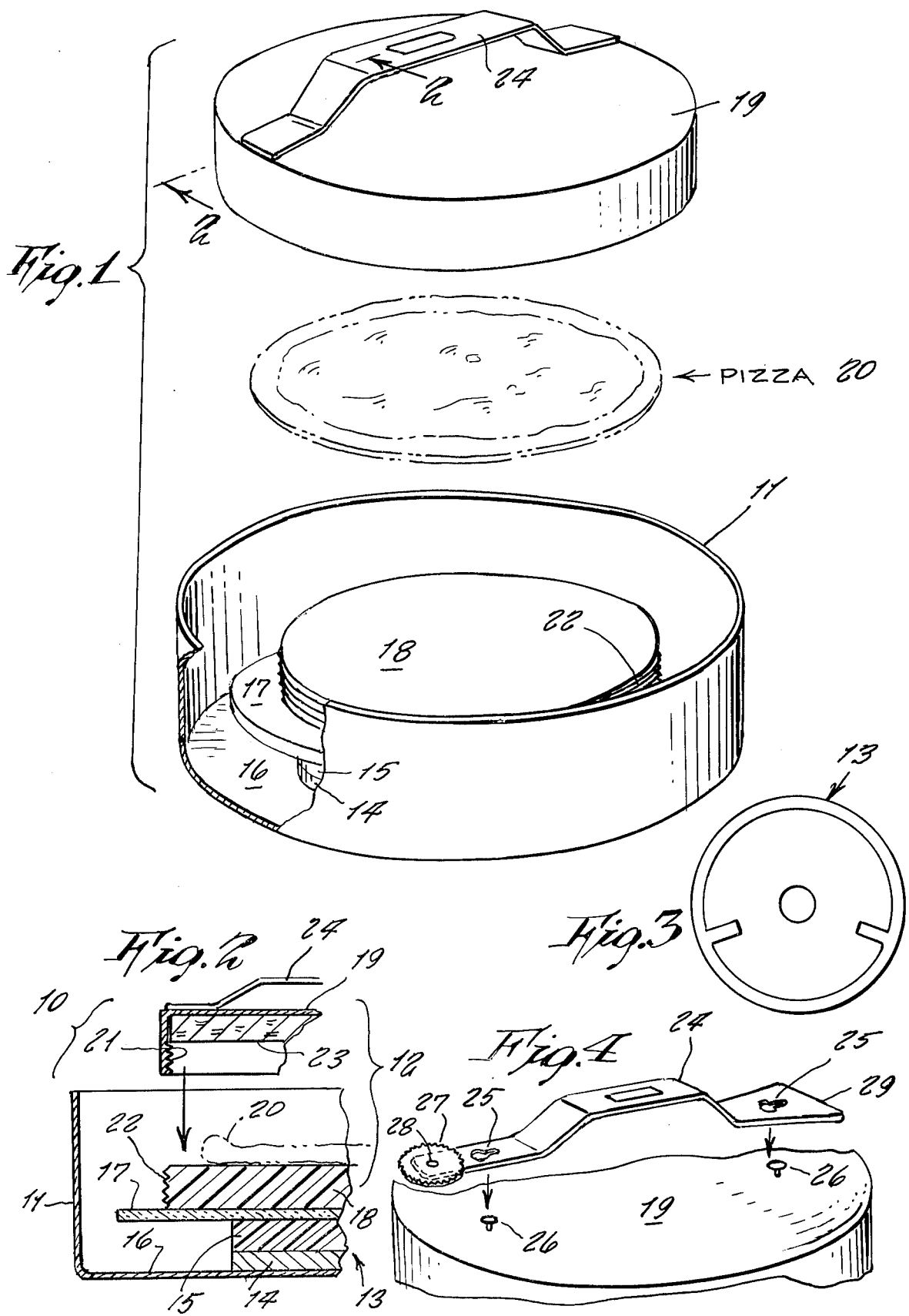

THERMAL PIZZA PLATE

This invention relates generally to hot food carriers.

It is generally well known that, in order to enjoy eating pizzas, they should be hot. Many persons also like obtaining take-out orders for bringing fresh-made pizzas home from a pizza shop so that they can enjoy eating it, while watching television or just being at home. A pizza pie thus carried home, especially during cold weather can quickly cool, so that it will not be as delightful, unless it is reheated at home. This situation is, accordingly, in want of an improvement.

Therefore, it is a principal object of the present invention to provide a thermal pizza plate, which serves as a carrier to keep the pizza hot while being carried home.

Another object is to provide a thermal pizza plate, which can be made for different sizes of pizza pies.

Still another object is to provide a thermal pizza plate, which, accordingly, eliminates the chore of reheating a cooled pizza, and which thus tastes better than a re-heated pizza.

Other objects of the invention are to provide a thermal pizza plate which is simple in design, inexpensive to manufacture, rugged in construction, easy to use and efficient in operation.

These and other objects will be readily evident upon a study of the following specification and the accompanying drawing, wherein:

FIG. 1 is a perspective view of the pizza plate and cover, shown separated;

FIG. 2 is a partial cross-sectional view, on line 2—2 of FIG. 1;

FIG. 3 is a top view of the rest for the insulation; and

FIG. 4 shows a modified design of the cover handle, which is removable from the lid, so as to be separately used; one end of the handle having a pizza pie cutter wheel for cutting a pizza, and the other end being shaped into a spatula, so as to serve pizza slices.

Referring now to the drawing in greater detail, and more particularly to FIGS. 1, 2 and 3 thereof at this time, the reference numeral 10 represents a thermal pizza plate, according to the present invention, wherein there is an outside container 11, made preferably of metal, and which serves as a cold wind shield for a pizza pie inner closure 12, located therewithin.

A rest 13, comprised of a lower metal disc 14 and an upper plastic disc 15, is mounted upon the bottom wall 16 of the container. A large diameter insulation disc 17 is mounted upon the rest, and a relatively thick plastic filter 18 is mounted upon a center of the insulation. The plastic filter, together with a lid 19, that screws therearound, comprise the closure 12, that encloses a pizza pie 20 placed on top of the plastic filter.

The lid includes a circular downward depending side wall, having a screw thread 21 on its inner side for screwing with an external screw thread 22, around the outer side of the plastic filter. A layer of cork 23 lines the underside of the lid, and a diametrically extending handle 24, across the top of the lid, provides means for carrying the thermal pizza plate.

In a modified design of the invention, shown in FIG. 4, the handle, additionally, is made to be removable from the lid, by including bayonet slots 25 for receiving rivets 26 of the lid in a conventional manner. At one end of the handle, there is a rotatable pizza cutter wheel 27, mounted on a pin 28. The opposite end of the handle is made with a widened end edge 29, so as to serve as a spatula.

While various changes may be made in the detail construction, it is understood that such changes will be within the spirit and scope of the present invention as is defined by the appended claims.

What I now claim is:

1. A thermal pizza plate, comprising, in combination, an outside container, a rest mounted inside said container, an insulation disc mounted upon said rest, and an inner closure upon said insulation disc; said rest comprising a lower disc of metal secured upon a bottom wall of said container, and an upper disc made of plastic; said inner closure comprising a plastic filter mounted upon said insulation disc, so that a pizza pie can be placed upon said plastic filter, and a lid placeable over said pizza pie, said plastic filter having an external screw thread around its outer side engagable with an internal screw thread on a side wall of said lid.

2. A thermal pizza plate, comprising, in combination, an outside container, a rest mounted inside said container, an insulation disc mounted upon said rest, and an inner closure upon said insulation disc; said rest comprising a lower disc of metal secured upon a bottom wall of said container, and an upper disc made of plastic; said inner closure comprising a plastic filter mounted upon said insulation disc, so that a pizza pie can be placed upon said plastic filter, and a lid placeable over said pizza pie, said plastic filter having an external screw thread around its outer side engagable with an internal screw thread on a side wall of said lid, said lid including a diametrically extending handle across the top of said lid, said handle including means to cut up and serve said pizza pie.

* * * * *